(12) United States Patent
Ritchie et al.

(10) Patent No.: US 6,777,454 B2
(45) Date of Patent: Aug. 17, 2004

(54) VESICULATED POLYESTER GRANULES

(75) Inventors: Philip J. A. Ritchie, Balaclava (AU); Algirdas K. Serelis, Mount Waverley (AU)

(73) Assignee: Orica Australia Pty Ltd., Victoria (AU)

( * ) Notice: Subject to any disclaimer, the term of this patent is extended or adjusted under 35 U.S.C. 154(b) by 80 days.

(21) Appl. No.: 10/183,988

(22) Filed: Jun. 28, 2002

(65) Prior Publication Data

US 2003/0040557 A1 Feb. 27, 2003

(30) Foreign Application Priority Data

Jun. 29, 2001 (AU) .............................. PR6040

(51) Int. Cl.$^7$ ................. C08J 9/28
(52) U.S. Cl. ............. 521/62; 521/63; 521/69; 521/88; 521/114; 521/138; 521/149; 523/502; 524/43; 524/44; 524/45; 524/48; 524/49
(58) Field of Search ............. 521/62, 63, 69, 521/88, 114, 138, 149; 523/502; 525/43, 44, 45, 48, 49

(56) References Cited

U.S. PATENT DOCUMENTS

| 3,822,224 | A | | 7/1974 | Gillian et al. |
| 3,879,314 | A | | 4/1975 | Gunning et al. |
| 3,891,577 | A | | 6/1975 | Kershaw et al. |
| 3,923,704 | A | | 12/1975 | Gunning et al. |
| 3,933,579 | A | | 1/1976 | Kershaw et al. |
| 3,979,342 | A | * | 9/1976 | Baidins et al. ............... 521/162 |
| 4,137,380 | A | | 1/1979 | Gunning et al. |
| 4,321,332 | A | | 3/1982 | Beresford et al. |
| 4,483,945 | A | * | 11/1984 | Beresford et al. ............ 521/62 |

FOREIGN PATENT DOCUMENTS

WO 84/00764 8/1983

OTHER PUBLICATIONS

Patent Abstract of AU–B–60684/94.

* cited by examiner

Primary Examiner—Patricia A. Short
(74) Attorney, Agent, or Firm—Pillsbury Winthrop LLP

(57) ABSTRACT

This invention relates to a process of preparing vesiculated granules of crosslinked carboxylated polyester resin utilising a particular class of non-alkylphenolethoxylate surfactant.

28 Claims, No Drawings

VESICULATED POLYESTER GRANULES

BACKGROUND OF THE INVENTION

1. Field of the Invention

This invention relates to vesiculated polyester granules and more particularly to a process of preparing such granules utilising a particular class of non-alkylphenolethoxylate surfactant.

2. Disclosure of the Related Art

Opacifiers are important components of paints, having the primary function of scattering light incident on the paint film. How well a paint is able to visually obliterate a surface over which it is applied is referred to as its opacity. Titanium dioxide pigment is traditionally used as the main opacifier and it, together with the polymeric film former (most usually a latex), are the two main contributors to paint formula cost. In the formulation of lowsheen (eggshell) but more particularly flat paints, mineral extender pigments such as calcite, clay or talc are incorporated to reduce specular reflection down to the desired level.

Since mineral extenders are comparatively cheap they may be added at such a level that there is insufficient film former to bind (space fill) all the pigment present. The paint formulator uses the term critical pigment concentration (CPVC) to describe the point where complete space filling can no longer occur. Addition of further quantities of mineral extender therefore leads to the formation of air voids in the film as drying occurs. These voids scatter light in their own right and contribute to paint film opacity thereby allowing an opportunity to reduce the level of titanium dioxide and still achieve acceptable opacity or coverage. The accompanying formula cost saving, however, is at the expense of other paint film properties such as scrub resistance and stain resistance. In the case of stain resistance, the problem is that of stains penetrating into the voids in the film (film porosity).

In order to improve film integrity (reduce film porosity) vesiculated polyester granules were developed which encapsulated the voids within a polyester granule or bead. Although air is not as good as titanium dioxide in scattering light, these vesiculated beads have been successfully used as opacifiers in paints for many years. In addition to reducing the amount of $TiO_2$ required in the paint, the use of vesiculated polyester beads reduces the amount of latex solids required to form a well integrated paint film. The spherical shape and smooth surface of the beads (low specific surface area) combined with their particle size distribution means that less latex is required to provide the level of binding required. The light scattering ability of the beads can be increased by incorporating an inorganic pigment, such as $TiO_2$, into the beads.

It is well known that vesiculated granules of carboxylated unsaturated polyester crosslinked with ethylenically unsaturated monomer can confer advantageous properties on coating compositions in which they are incorporated, and as a result there has been extensive usage of such granules in a variety of applications. The background to the subject is well covered in the literature, for example, in articles by Kershaw (Australian OCCA Proceedings and News, 8 No. 8, 4 (1971)), Lubbock (Australian OCCA Proceedings and News, 11, No. 5, 12 (1974)), Hislop and McGinley (Journal of Coatings Technology, 50 (642), 69 (1978)), and Bierwagen (Congress Book of the XVth FATIPEC Congress, 3E-Activities, Vol. 111, 110 (1980)). A number of patents relating to these granules and their use in coating compositions have also been issued; these including U.S. Pat. Nos. 3,822,224, 3,879,314, 3,891,577, 3,923,704, 3,933,579, 4,137,380 and 4,321,332.

The preferred process of preparation of such granules is now well established. It is a "double emulsion" process wherein water is first stably dispersed in a solution in polymerisable monomer of a carboxylated unsaturated polyester to give a "first emulsion" and the first emulsion is itself stably dispersed in water to give a "double emulsion".

Free radical polymerisation is then initiated to give vesiculated granules of crosslinked polyester resin. If pigmented vesiculated granules are required, pigment may be dispersed in either or both of the first emulsion components using conventional pigment dispersants.

Of the patents referred to above, U.S. Pat. No. 3,879,314 (Gunning et al.) describes "dimensionally stable" vesiculated granules, with U.S. Pat. No. 3,923,704 describing an improved process of preparing these dimensionally stable granules and U.S. Pat. No. 4,321,332 (Beresford and Braun) demonstrates the achievement of dimensional stability without the need for the polyamide bases of Gunning et al. In U.S. Pat. No. 4,321,332, the polyamine required for stabilisation of the first emulsion was replaced by an oxide, hydroxide or weak acid salt of a selected metal cation; in this way, the odour and yellowing effects of the polyamine could be considerably reduced (these granules shall hereinafter be referred to as "oxide granules"). Both of these types of granules have been used successfully in coating compositions.

However, it had sometimes been found that when oxide granules were prepared on a large scale that there had been an unacceptably high incidence of "grit" particles, that is, aggregates of two or more granules which are formed during large scale production thereof. One cause of this was the coming together and partial coalescence of individual granules prior to curing; on polymerisation initiation, they fuse to give "grit" particles. These particles are visible to the naked eye and their presence in coating compositions is highly undesirable as they appear as visible imperfections in the film.

WO84/00764 describes a process for preparing granules using an alkyl phenol containing anionic surfactant. The process described in that specification was said to reduce or completely eradicate the incidence of grit in oxide granules and to achieve opacities higher than could be previously achieved. In fact the surfactant described in WO84/00764 has been found to be particularly useful in ensuring that:

(a) the granules have the correct level, size and size distribution of internal microvoids to maximise light scattering thereby optimising the opacity or coverage of any paint which contains these granules;

(b) the spherical particles have few if any surface imperfections (surface holes) as such imperfections compromise the stain resistance of paints containing the granules;

(c) the granules/beads are sufficiently well stabilised to not aggregate (form grit) to any significant degree during polymerisation; and (d) the process for making the granules is sufficiently robust to accommodate higher temperatures for formation of the granules prior to polymerisation being initiated (up to 50 EC.). Such higher temperatures lead to higher temperatures of exotherm leading to better levels of conversion of monomer to polymer thus reducing residual odour of the granule slurry. This is described in Australian Patent No. 670363 (ICI Plc).

In addition to the above, the surfactant was effective as a dispersant for pigment in water if that was the chosen route toward preparing the first emulsion as past of a process for making pigmented vesiculated granules.

While the alkylphenol ethoxylate surfactant described in WO84/00764 allowed the consistent production of vesiculated polyester granules with the desired properties, the commercial use of such surfactants has fallen out of favour.

In recent years there has been an increased focus on the toxicity profile of all raw materials used in industrial processes. In particular, and especially in Europe, the use of alkyl phenol based surfactants such as the alkylphenolethoxylates (APE) described in WO84/00764 are being phased out of consumer product formulations. Alkyl phenol surfactants, when they enter waterways, degrade to residues which can be toxic to fish (gill function). In fish, these residues also mimic oestrogen and are said to give rise to hormone malfunction with anatomical consequences in some laboratory test situations. Whether or not these findings could relate to real situations with consequences for humans has not been established. However, the degree of negative publicity, particularly in Europe, has resulted in vigorous programs by consumer product manufacturers to remove APE surfactants from all formulations.

However, the replacement of these surfactants has proven to be particularly difficult for the formulator. The specific factors at play vary according to the formulation, but in broad terms the phenyl group, as part of the hydrophobic (oil compatible) portion of the surfactant molecule, imparts specific anchoring properties (to pigment particles for example) and/or surfactant interfacial spacial arrangement properties. For these reasons it is usually very difficult to replicate the precise balance of formulation properties without the use of these surfactants.

SUMMARY OF THE INVENTION

It has now been surprisingly found that a particular class of non-APE surfactant is capable of providing the advantages associated with the previously used APE surfactants.

Accordingly, the present invention provides a process of preparing vesiculated granules of crosslinked carboxylated polyester resin, said process comprising the steps of:

(a) forming a dispersion of particles of a solution in ethylenically unsaturated monomer of a carboxylated unsaturated polyester resin having an acid value of from 5–50 mg KOH/g, the solution also containing water droplets which are dispersed in the presence of a base selected from:
  (i) a water-soluble polyamine which contains at least three amine groups per molecule and which has a dissociation constant (pKa value) of 9.5–10.5; and
  (ii) a metal oxide, hydroxide or salt wherein the metal cation is chosen from the group consisting of calcium, magnesium, barium, titanium, zinc, lead, strontium and cobalt, the salt being one wherein the $pK_a$ value of the conjugate acid of the anion is greater than 2;
  the dispersion additionally containing a surfactant which is free of alkylphenol moieties, and
(b) initiating free radical polymerisation to cross-link the polyester and monomer and provide crosslinked, vesiculated granules, wherein:
  (i) where a water-soluble polyamine is used, there are present from 0.3–4.0 amine groups per polyester carboxyl group;
  (ii) where a metal oxide, hydroxide or salt is used, there is present from 0.8–1.8 equivalents of metal cation per equivalent of polyester carboxyl group; and
  (iii) the surfactant comprises a species of the formula (I)

$$C_aH_{2a+1}\text{—O—}(CH_2CH_2O)_b SO_3^-  \qquad (I)$$

where a is 6 to 12 and b is 2 to 8.

Preferably a is 8 to 11; and b is preferably from 3 to 5.

DESCRIPTION OF PREFERRED EMBODIMENTS

Carboxylated unsaturated polyester resins which will crosslink by reaction with unsaturated monomers are well known. Suitable polyester resins are the condensation products of dicarboxylic acids (or their corresponding anhydrides) and dihydric alcohols, polymerisable unsaturation being introduced into the chain by the use of a proportion of ∀,∃-ethylenically unsaturated acid.

The polyester resins from which a selection is made are condensation products of polybasic acids (or the corresponding anhydrides) and dihydric alcohols. Polymerisable unsaturation is introduced into the molecule by the selection of an ∀,∃-ethylenically unsaturated acid, optionally in combination with a saturated acid or anhydride.

Thus suitable acids are, for example: unsaturated aliphatic acids, such as maleic, fumaric and itaconic acids; saturated aliphatic acids, such as malonic, succinic, glutaric, adipic, pimelic, axelaic, tetrahydrophthalic, chlorendic and sebacic acids; and saturated aromatic acids, such as phthalic, isophthalic, terephthalic, tetra-chlorophthalic, trimellitic and trimesic.

Suitable dihydric alcohols are chosen from, for example, ethylene glycol, poly(ethylene glycols) e.g. diethylene glycol, hexane 1, 6-diol, propylene glycol, di-cyclohexanol and neopentyl glycol. Alternatively, the alcohol may be one which initially contained three or more hydroxyl groups, the hydroxyl groups in excess of two optionally being at least in part etherified with, for example, a monohydric alcohol e.g. methanol, ethanol and n-butanol or esterified with a monobasic acid, e.g. benzoic acid, p-tert.-butyl benzoic acid and chain-like aliphatic acids of up to 18 carbon atoms chain length e.g. coconut oil monoglyceride.

The methods by which unsaturated polyesters of this type are formulated and made are well known in the art.

It is essential to the working of the process that the acid value of the polyester lie within certain limits. As disclosed in WO84/00764 it is essential to select polyesters whose acid values lie in the range 5–50 mg KOH/g, preferably 10–25 mg KOH/g and most preferably 15–20 mg KOH/g.

The unsaturated monomer in which the unsaturated polyester resin is dissolved and crosslinked must be essentially water-insoluble. Monomers which have a solubility at 20 EC. of less than 5% (w/w) in water are considered to be suitably water-insoluble for this purpose. A single monomer or a mixture of monomers may be used and in general the monomer will contain only a single polymerisable double bond. However, it is known that polyfunctional monomers, that is, monomers containing more than one polymerisable double bond, may also be used to crosslink unsaturated polyester resins. Such polyfunctional monomers are, however, normally present only as a minor constituent of a mixture of monomers, the major proportion of which is monofunctional monomer. Hence mixtures comprising monomers such as divinyl benzene may be used in the performance of the present invention.

The preferred ethylenically unsaturated monomers for general use in the present invention are selected from styrene, the mixed isomers of methyl styrene commercially available as "vinyl toluene" and methylmethacrylate, because of the ease with which they can be copolymerised with the unsaturated polyester resin. For optimum results, it is preferred that the monomer shall comprise at least 50% by weight of styrene.

The choice of monomer is not, however, restricted to the above monomers alone. Bearing in mind the requirements that the total monomer must be essentially insoluble in water and also be a solvent for the unsaturated polyester resin, there may be present in a minor proportion other polymerisable unsaturated monomers to, for example, modify the physical properties of the co-reacted resins. Typical co-monomers are, for example, ethyl acrylate, n-butyl methacrylate, acrylonitrile, and triallyl cyanurate. In general, it has been found that the upper limit of usefulness of such monomers is 10% by weight of the total monomer used. Higher concentrations give granules which are either too brittle or too rubbery to be used effectively in paints.

Optionally a few percent by weight of a non-polymerising organic liquid, e.g. n-butanol or toluene, may be mixed with the monomer to increase the solubility of the polyester resin therein or may be introduced as an incidental part of the process, e.g. in preparing the polyester.

There is included in the dispersions according to the present invention a surfactant which comprises a species of the formula (I):

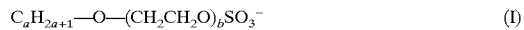

$$C_aH_{2a+1}\text{—}O\text{—}(CH_2CH_2O)_bSO_3^-  \qquad (I)$$

where a is 6 to 12 and b is 2 to 8. This surfactant is typically present to the extent of 0.75–7.5% (preferably 3.0–4.5%) by weight of dispersant solids per volume of total granule solids and may be added initially to any of the phases of the dispersion prior to polymerisation.

A counter ion for the species shown above may be selected from any suitable materials. Naturally, it is preferable to avoid those which confer deleterious properties; for example, some metal cations can impart quite strong colours and some organic cations confer strong odours. Counter ions which are suitable for use in the present invention are, for example, $NH_4^+$, $Mg^{2+}$ and $K^+$, with $NH_4^+$ being an especially preferred counter ion.

The base used in this invention may be selected from the polyamine bases of the variety described by Gunning in U.S. Pat. Nos. 3,879,314 and 3,923,704, such as diethylene triamine, triethylene tetramine and oligomers of vinyl pyridine or dimethylaminoethylmethacrylate with polyethylene glycol methacrylate or mixtures thereof, or the metal oxide, hydroxide and salt bases described by Beresford in U.S. Pat. No. 4,321,332, being those of the metals Ca, Mg, Ba, Ti, Zn, Pb, Sr and Co, and when the salt is used, the pKa of the conjugate acid of the anion is greater than 2. The entire disclosures of these three patent documents are incorporated herein by reference. It has been found that for the purposes of the present invention, magnesium oxide is the preferred base. When an amine base is used, sufficient amine should be present such that there are present 0.3–4.0, preferably 1.3–3.2 amine groups per polyester carboxyl group. When a metal oxide, hydroxide or salt base is used, sufficient base should be present such that there is present 0.8–1.8 equivalents of metal cation per equivalent of polyester carboxyl group.

When pigmented granules are desired, the pigment may be selected from any suitable pigment known to the art. It has been found that commercial enamel grades of rutile titanium dioxide are the best pigments for our purposes. A large number of these are available and their suitability for use in our process varies according to the nature and size of the coating on the pigment particles. The most suitable pigments for use in a given formulation are best determined by trial and error. It is permissible to use other primary pigments and extenders such as calcite and barytes. The non-APE surfactant (species of formula (I)) described in this invention is also suitable as a dispersant for such pigment in water if that is the chosen route toward preparing the first emulsion as part of a process for making pigmented vesiculated granules.

The preferred method of preparation of granules according to the present invention involves the "double emulsion" method referred to above. A process of preparing unpigmented vesiculated granules in a "single emulsion" is known. In this process, described by Gillan and Kershaw in U.S. Pat. No. 3,822,224, a carboxylated unsaturated polyester resin is dispersed in water and polymerised, the vesicles forming spontaneously within the dispersed resin globules. It was thought, however, that where pigmentation of the granules was desired, a double emulsion process was still essential for optimum vesiculation and pigment dispersion and utilisation. It has now been found that the present process allows, in some circumstances, the preparation of pigmented vesiculated granules using a single emulsion process. This option is a potentially very valuable one as it offers reduced production times and increased convenience of handling.

The initial stage in the preparation of dimensionally stable granules according to the present invention by the "double emulsion" process is the emulsification of water into the solution in ethylenically unsaturated monomer of carboxylated unsaturated polyester resin (the solution in ethylenically unsaturated monomer of carboxylated unsaturated polyester resin shall hereinafter be referred to as "the polyester solution" and the emulsion of water in the polyester solution shall hereinafter be referred to as "the first emulsion"). This is carried out by mechanical agitation which is continued until the viscosity of the emulsion is essentially constant. It has been found that, during this stage, it is essential that the rate of agitation be carefully regulated. The maximum rate of agitation depends on the particular formulation and the type of agitation used, but as a general guide, it has been found that for impeller-type agitators, the maximum permissible impeller tip speed is about 10 meters per second. This speed is somewhat lower than the 15 meters per second disclosed by Gunning in U.S. Pat. No. 3,923,704, but it has been found that for the purpose of the present invention, tip speeds in excess of about 10 meters per second result in inferior granules. It is preferred that the tip speed be kept below about 8 meters per second. The agitation is carried out in the presence of the base (or metal oxide, hydroxide or salt) which may be present in the polyester solution, the water or both. If pigmented granules are required, the pigment may be added at this stage, or it may be added to the water, the polyester solution or both prior to the formation of the first emulsion.

The first emulsion is dispersed in water which contains a stabiliser for the dispersed first emulsion particles and stirred until the desired granule size is achieved. This dispersion is the "double emulsion". The stabiliser may be chosen from the wide range of materials known to be suitable for this purpose but it has been found that an especially suitable material is a water soluble partially hydrolysed poly(vinyl acetate) with a molecular weight of about 100,000 and a degree of hydrolysis of 85–90%. As a general guide, it has been found that a concentration of stabiliser of the order of 0.1–2.0% by weight of the total water (vesicular water & continuous phase water) gives satisfactory results. The surfactant may be added at any stage of the process prior to polymerisation and to any phase of the double emulsion.

An increase in the viscosity of the water can often assist in the dispersion of the emulsion; such an increase can be achieved by the addition to the water of a water soluble polymeric thickener. Suitable thickeners are well known to the art and include such compounds as hydroxyethyl cellulose, typically used at a concentration of about 0.1–0.5% by weight of the continuous water phase. The use of a thickener is advantageous as it spreads the shear stress delivered by the stirrer throughout the dispersion, thereby assisting in the formation of granules with a symmetrical particle size distribution. The thickener is also believed to have a stabilising effect.

When the first emulsion is dispersed in water there is believed to be an uptake of water into the granules. This may be due to salt present in the voids. As the voids/water droplets grow they coalesce to produce bigger voids/water droplets within the organic phase. During this process a typical "water in oil" droplet would increase its water content form about 34% on a volume basis to about 70%. This corresponds to a typical increase in void size from about 250 nm to 2500 nm. In view of the water uptake, there is also a thickening effect which is a particularly useful processing characteristic.

The water content of the "water in oil" droplets in the second emulsion is very important. If there is too much water, such as 75%, then the granules formed may have holes on the surface. These holes can lead to reduced stain resistance in the final paint film. If there is too little water, then the voids are too small and the opacity of the granules is reduced. It is known that the surfactant of formula (I) has a role in stabilising the "water in oil" droplets and has an influence on how much and how quickly water is taken up.

Polymerisation of the polyester resin is effected by free radical means. This can be achieved by the use of a free radical initiator such as an organic peroxide or by exposure to a radiation source such as ultra-violet radiation or a radio-active element. When a free radical initiator is used it may be conveniently dissolved in the polyester resin solution before the dispersion of the solution in water or it may be conveniently dissolved in the polyester resin solution before the dispersion of the solution in water or it may be added to the continuous water phase following the formation of the double emulsion.

For plant operational reasons, the currently preferred initiation system is a redox system of diethylene triamine and t-butyl perbenzoate triggered by ferrous ions derived from ferrous sulphate. The peracid ester is added to the organic phase prior to formation of the first emulsion while the amine and ferrous sulphate solution are added to the aqueous continuous phase after the prepolymerised granules have been processed to the correct size.

Following this initiation step, suspension polymerisation proceeds which is accompanied by an exotherm which increases the temperature of the dispersion. The higher the maximum temperature, the better the conversion of monomer to polymer. Normally, the second emulsion is prepared at room temperature (25 EC.). The temperature is then raised to between 35 EC. and 40 EC. by adding warm water (or a mixture of hot and cold water), following which the initiators are added. Polymerisation then commences taking the temperature of the dispersion up to 50 to 55 E. However, performing the polymerisation at a higher temperature can reduce unpleasant odour in the final paint product. Improved results can be obtained by ensuring the dispersion is at 50 E when the initiators are added ensuring a maximum temperature of about 70 EC. is achieved (refer ICI Plc, Australian Patent No. 670363). Also, better conversion can be achieved by performing the polymerisation under a nitrogen blanket, thereby removing inhibition of polymerisation by air.

The aqueous slurry of vesiculated polyester granules thus formed may be used directly in an aqueous latex paint, or it may be dewatered, by any convenient means, for example the method described in U.S. Pat. No. 4,154,923, and subsequently redispersed in an aqueous or non-aqueous medium, or incorporated into a paste, for example, for use as a filler or a putty.

The paint compositions prepared using granules according to the present process are consistently as opaque as those prepared using granules prepared according to the process described in WO84/00764, and more opaque than otherwise identical compositions comprising granules known to the art; this difference is especially marked in paint comparisons with a high pigment volume concentration (PVC).

The granules of the present invention offer the paint formulator considerable latitude: he/she can reformulate a paint to maintain opacity whilst achieving considerable cost savings or he/she can reformulate to achieve a higher degree of opacity and whiteness without adding to the paint formula cost.

DETAILED DESCRIPTION OF THE INVENTION

The invention is further described with reference to the following examples in which all parts are expressed by weight. It should be noted, however, that the particularity of the following description of the invention should not supersede the generality of the preceding description of the invention.

EXAMPLES

A number of surfactants were evaluated on an equal solids basis in the preparation of 25 Φm pigmented vesiculated polyester resin granules. The granules were compared to a control based on an ammonium nonyl phenyl ethoxylate (5EO)sulphate as described in WO94/00764.

Procedure:

| Stage | Material | Parts by weight (g) |
|---|---|---|
| A | Water | 33.98 |
|   | Surfactant (as 60% solids solution in water) [1] | 2.21 |
|   | Antifoam [2] | 0.16 |
|   | Titanium dioxide pigment (Tronox CR-828 ex Kerr-McGee Corporation | 90.41 |
| B | Water | 42.80 |
| C | Polyester resin [3] | 74.12 |
|   | Styrene | 41.20 |
| D | Magnesium oxide | 0.39 |
|   | t-butyl perbenzoate [4] | 0.93 |
| E | Hydroxyethylcellulose soln [5] | 73.68 |
|   | Poly(vinyl alcohol) soln [6] | 42.94 |
|   | Water | 108.19 |
| F | Water | 164.84 |

-continued

| Stage | Material | Parts by weight (g) |
|---|---|---|
| G | Water | 218.02 |
| | Ferrous sulphate heptahydrate ($FeSO_4 \cdot 7H_2O$) | 0.03 |
| | Diethylene triamine | 0.46 |
| | | 894.36 |

[1]The following surfactants were evaluated in turn in separate laboratory make-ups:
(a): $C_aH_{2a+1}$—O—$(CH_2 CH_2 O)_b$ $SO_3^-$ammonium ($NH_4^+$)salt where a = 9–11 mix and b = 5
(b): As above, but where a = 8–10 mix and b = 3
(c): As above, but where a = 12–15 mix and b = 4.4
(d): As above, but where a = 9–11 mix and b = 2
(e): As above, but where a = 9–11 mix and b = 2
(f): As above, but where a = 18 and b = 5
[2]Antifoam "Foamaster NS-1" ex Cognis Pty Ltd
[3]A 65% weight solids solution of a 2.26/0.88/3.74 (molar) maleic anhydride/phthalic anhydride/propylene glycol polyester in styrene was used.
[4]"Interox TBPB" ex Laporte Organcs (98% t-butyl perbenzoate).
[5]A 1.5 wt-% solids aqueous solution of "Natrosol 250 HR" ex Aqualon Co. USA was used.
[6]A 7.5 wt-% solids aqueous solution of "Poval 224" ex Kuraray, Japan was used.

The materials A were mixed with the pigment being added to form a millbase. Stirring was continued at high speed until the pigment was completely dispersed (20 min). The water B was then added at slow stirrer speed.

During the above, the stage C materials were mixed with the magnesium oxide and peroxide being incorporated at slow speed. The A-B mix was then added to C and stirred to form a water-in-oil emulsion. This was the "first emulsion".

The materials E were then blended. The F stage water (hot) was then added. The temperature of the F stage was such that when the first emulsion was added under stirring then the temperature of the whole (stages A-E inclusive) was 50 EC. After addition of the first emulsion, stirring was continued until the largest globules of first emulsion were about 25 Φm in diameter with the mean size being around 13 Φm in diameter. At this stage water at 50 EC. (F stage) was added under slow stirring followed by addition of the ferrous sulphate dissolved in a trace amount of hot water concluding with the addition of the diethylene triamine. The stirrer was then turned off and the mixture allowed to cure overnight.

The mixture was then stirred up, examined under an optical microscope and filtered to assess the level of grit. It was then made up into a standard flat latex paint formulation which was then in turn assessed for film properties versus a control. In this context, film properties assessed were coverage (opacity or the ability of the paint to obliterate the surface over which it is applied) and stain resistance.

The results for the various surfactants tested are provided below:
(a) and (b)—an excellent result and equivalent to the control based on APE surfactant
(c)—poor stain resistance which may be related to the granules having surface imperfections.
(d)—high levels of aggregation (grit formation) during polymerisation (curing) of the granules.
(e)—high levels of aggregation during polymerisation
(f)—high levels of aggregation during polymerisation Those skilled in the art will appreciate that the invention described herein is susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A process of preparing vesiculated granules of crosslinked carboxylated polyester resin, said process comprising the steps of:
   (a) forming a dispersion of particles of a solution in ethylenically unsaturated monomer of a carboxylated unsaturated polyester resin having an acid value of from 5–50mg KOh/g, th solution also containing water droplets which are dispersed in the presence of a base selected from:
      Ci) a water-soluble polyamine which contains at least three amine groups per molecule and which has a dissociation constant (pKa value) of 9.5–10.5; and
      (ii) a metal oxide, hydroxide or salt wherein the metal cation is chosen from the group consisting of calcium, magnesium, barium, titanium, zinc, lead, stroatium and cobalt, the salt being one wherein the $pK_a$ value of the conjugate acid of the anion is greater than 2;
   the dispersion additionally containing a surfactant which is free of alkylphenol moieties, and
   (b) initiating free radical polymerisation to cross-link the polyester and monomer and provide crosslinked, vesiculated granules, wherein:
      (i) where a water-soluble polyamine is used, there are present from 0.3–4.0 amine groups per polyester carboxyl group;
      (ii) where a metal oxide, hydroxide or salt is used, there is present from 0.8–1.8 equivalents of metal cation per equivalent of polyester carboxyl group; and
      (iii) the surfacant comprises a species of the formula (I)

$$C_aH_{2a+1}\text{—O—}(CH_2CH_2O)_bSO_3^- \tag{1}$$

where a is 6 to 12 and b is 2 to 8.

2. A process according to claim 1 wherein a is 8 to 11.

3. A process according to claim 1 wherein b is from 3 to 5.

4. A process according to claim 1 wherein the carboxylated unsaturated polyester resin is an unsaturated condensation product of a polybasic acid (or corresponding anhydride) and a dihydric alcohol.

5. A process according to claim 4 wherein the polybasic acid is selected from unsaturated aliphanic acids, saturated aliphatic acids and saturated aromatic acids.

6. A process according to claim 4 wherein the dihydric alcohol is selected from ethylene glycol, poly(ethylene glycols), and alcohols which contain three or more hydroxyl groups, the hydroxyl groups in excess of two optionally being at least in part etherified with a monohydric alcohol or esterified with a monobasic acid.

7. A process according to claim 1 wherein the ethylenically unsaturated monomer has a solubiliry of 20° C. of less than 5% (w/w) in water.

8. A process according to claim 1 wherein the ethylenically unsaturated monomer is a mixture of monomers.

9. A process according to claim 8 wherein the ethylenically unsaturated monomer includes a minor amount of a polyfunctional monomer.

10. A process according to claim 9 wherein the polyfunctional monomer is divinyl bernzene.

11. A process according to claim 1 wherein the ethylenically unsaturated monomer is selected from styrene, methyl styrene and methymethacrylate and mixtures thereof.

12. A process according to claim 8 wherein the ethylenicaily unsaturated monomer includes a minor amount of a comonomer selected from ethyl acrylate, n-butyl, methacrylate, acrylonitrile and triallyl cyanurate.

13. A process according to claim 1 wherein the surfactant is present in an amount of fron 0.75 to 7.5% by weight of dispersant solids per volume of total granule solids.

14. A process according to claim 1 wherein the surfactant has a counter ion selected from $NH_4^+$, $Mg^{2+}$ and $K^+$.

15. A process according to claim 1 wherein the base is a polyamine base selected from diethylene triamine, triethylene tetramine and oligomers of vinyl pyridine or dimethylaminoethylmethacrylate with polyethylene glycol methacrylare or mixtures thereof.

16. A process according to claim 1 wherein the base is magnesium oxide.

17. A process according to claim 16 wherein the magnesium oxide is present such that there are 0.8 to 1.8 equivalents of metal cation per polyester carboxyl group.

18. A process according to claim 15 wherein the base is an amine base present in an amount such that there are present 0.3 to 4.0 amine groups per polyester carboxyl group.

19. A process according to claim 1 wherein the dispersion of particles of a solution in ethylenically unsaturated monomer of carboxylic unsaturated polyester resin is prepared by a double emulsion process in which water is emulsified into a solution in ethylenicailly unsaturated monomer of a carboxylated unsaturated polyester resin by mechanical agitation to form a first emulsion, which emulsion is dispersed in water in the presence of a stabiliser to form a double emulsion.

20. A process according to claim 19 wherein the stabiliser is a water soluble partially hydrolysed poly(vinyl acetate) with a molecular weight of about 100,000 and a degree of hydrolysis of 85–90%.

21. A process according to claim 19 wherein the first emulsion is dispersed in water in the presence of a water-soluble polymeric thickener.

22. A process according to claim 21 wherein the thickener is hydroxyethyl cellulose.

23. A process according to claim 22 wherein the concentration of hydroxymethyl cellulose is about 01 to 0.5% by weight of the continuous phase of the double emulsion.

24. A process according to claim 1 wherein the free radical polymerisation is initiated by the use of a free radical initiator or by exposure to a radiation source.

25. A process according to claim 24 wherein the polymerisation is initiated by a redox system of diethyl triamine and t-buryl perbenzoate triggered by ferrous ions derived from ferrous sulphate.

26. A process according to claim 19 wherein the double emulsion is prepared at room temperature and raised to a temperature of between 35° C. and 40° C. prior to addition of a free radical polymerisation initiator.

27. A process according to claim 19 wherein the double emulsion is raised to a temperature of about 50° C. prior to addition of a free radical polymerisation initiator.

28. A process according to claim 1 wherein the polymerisation is preformed under a nitrogen blanket.

* * * * *

UNITED STATES PATENT AND TRADEMARK OFFICE
CERTIFICATE OF CORRECTION

PATENT NO. : 6,777,454 B2
DATED : August 17, 2004
INVENTOR(S) : Phillip John A Ritchie et al.

It is certified that error appears in the above-identified patent and that said Letters Patent is hereby corrected as shown below:

Column 10,
Line 20, replace "from 5-50mg KOh/g, th" with -- from 5-50mg KOH/g, the --.
Line 23, replace "Ci) a water-soluble" with -- (i) a water-soluble --.
Line 29, replace "stroatium and cobalt" with -- strontium and cobalt --.
Line 64, replace "has a solubiliry of" with -- has a solubility of --.

Column 11,
Line 5, replace "a divinyl bernzene" with -- a divinyl benzene --.
Line 8, replace "styrene and methymethacrylate" with
-- styrene and methymethacrylate --.
Line 9, replace "wherein the ethylenicaily unsaturated" with -- wherein the ethylenically unsaturated --.
Line 14, replace "an amount of fron" with -- an amount from --.
Line 21, replace "glycol methacrylare" with -- glycol methacrylate --.

Column 12,
Line 1, replace "a solution is ethylenicailly" with -- a solution is ethylenically --.
Line 23, replace "and t-buryl" with -- and t-butyl --.
Line 33, replace "is preformed under" with -- is performed under --.

Signed and Sealed this

First Day of March, 2005

JON W. DUDAS
*Director of the United States Patent and Trademark Office*